(12) United States Patent
Yamaguchi

(10) Patent No.: US 12,377,726 B2
(45) Date of Patent: Aug. 5, 2025

(54) WORK VEHICLE

(71) Applicant: Yanmar Power Technology Co., Ltd., Osaka (JP)

(72) Inventor: Masafumi Yamaguchi, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 751 days.

(21) Appl. No.: 17/627,703

(22) PCT Filed: Jun. 5, 2020

(86) PCT No.: PCT/JP2020/022329
§ 371 (c)(1),
(2) Date: Jan. 17, 2022

(87) PCT Pub. No.: WO2021/010052
PCT Pub. Date: Jan. 21, 2021

(65) Prior Publication Data
US 2022/0250466 A1    Aug. 11, 2022

(30) Foreign Application Priority Data
Jul. 17, 2019    (JP) .................................. 2019-132183

(51) Int. Cl.
*B60K 15/067*    (2006.01)
*B60R 13/08*    (2006.01)
(Continued)

(52) U.S. Cl.
CPC ........ *B60K 15/067* (2013.01); *B60R 13/0838* (2013.01); *B60K 2015/0637* (2013.01); *B62D 49/0671* (2013.01)

(58) Field of Classification Search
CPC .......... B60K 15/067; B60K 2015/0637; B60R 13/0838; B62D 49/0671
(Continued)

(56) References Cited

U.S. PATENT DOCUMENTS

| 10,369,883 B2 | 8/2019 | Komatsu | |
|---|---|---|---|
| 2006/0027408 A1* | 2/2006 | Hirakawa | B60K 15/063 180/89.12 |

(Continued)

FOREIGN PATENT DOCUMENTS

| DE | 2736127 A1 | 2/1979 |
|---|---|---|
| JP | 4358941 B2 | 11/2009 |

(Continued)

*Primary Examiner* — Logan M Kraft
*Assistant Examiner* — Anthony Donald Taylor, Jr.
(74) *Attorney, Agent, or Firm* — Chris Mizumoto

(57) ABSTRACT

A work vehicle includes an engine provided inwards of a hood; a fuel tank provided extending in a front-back direction from the inside of the hood to the inside of a dashboard of a steering part; a tank support frame that supports the fuel tank; a fixing member that fixes the fuel tank supported by the tank support frame in place; and a rocking support frame that supports the hood such that the hood is capable of rocking vertically. The tank support frame and the rocking support frame are supported by a different member than the member supporting the engine, and include, as a fixing member, a first fixing member fixed extending from the tank support frame to the rocking support frame.

7 Claims, 9 Drawing Sheets

(51) Int. Cl.
*B60K 15/063* (2006.01)
*B62D 49/06* (2006.01)

(58) Field of Classification Search
USPC .......................................................... 280/834
See application file for complete search history.

(56) References Cited

U.S. PATENT DOCUMENTS

2015/0217634 A1* 8/2015 Sawai ..................... F01N 3/021
                                                                         280/834
2018/0229601 A1* 8/2018 Komatsu ................ B62D 25/14

FOREIGN PATENT DOCUMENTS

| JP | 2013136359 A | | 7/2013 | |
|---|---|---|---|---|
| JP | 2015143078 A | * | 8/2015 | ........... B60K 15/063 |
| JP | 2017035944 A | * | 2/2017 | ........... B60K 15/063 |
| JP | 6258052 B2 | | 1/2018 | |

* cited by examiner

WORK VEHICLE

CROSS-REFERENCE

This application is a US National Stage Application under 35 U.S.C. § 371 of International Application No. PCT/JP2020/022329 filed Jun. 5, 2020, which claims foreign priority of JP2019-132183 filed Jul. 17, 2019, the disclosures of which are hereby incorporated by reference in their entirety.

TECHNICAL FIELD

The present invention relates to a work vehicle provided with a fuel tank.

BACKGROUND ART

In recent years, it has been desired to increase the capacity of fuel tanks provided in work vehicles. Therefore, some fuel tanks are configured such that a fuel tank is arranged therein in a state were the fuel tank extends not only in a dashboard of a steering section but also in a hood on a front side thereof (see, for example, Patent Literature 1).

In the work vehicle described in Patent Literature 1, a tank support body supporting a fuel tank is provided in a hood, and the tank support body is connected and supported by an engine. In a rear side of the fuel tank, an inverted U-shaped hood support body is provided to stand upward in a state of straddling over the fuel tank in a left-right direction and clamps and holds a rear side of the fuel tank by left and right elastic bodies of the hood support body. A fixing band used for fixing the fuel tank supported by the tank support body is provided. The fixing band is formed in an inverted U-shape that stands upward in a state of straddling the fuel tank in the left-right direction in a front side of the fuel tank with both ends of the fixing band fixed to the tank support body.

CITATION LIST

Patent Literature

Patent Literature 1: Japanese Patent No. 6258052

DISCLOSURE OF INVENTION

Problems to be Solved by the Invention

In the work vehicle described in Patent Literature 1, in order to increase a capacity of the fuel tank, the fuel tank is extended to the front side as well and a front side portion of the fuel tank is arranged in the hood. However, the engine serving as a vibration source is provided in the hood, and therefore, it is desired to prevent the fuel tank from vibrating along with vibration of the engine.

In the work vehicle described in Patent Literature 1, the tank support body is connected and supported by the engine via a support member directly connected to an upper portion of the engine and, moreover, the both ends of the fixing band are fixed to the tank support body, so that the engine, the support member, the tank support body, and the fixing band are caused to integrally vibrate by vibration of the engine. Accordingly, the fuel tank is caused to vibrate by the vibration of the fixing band, and the fuel tank vibrates along with the vibration of the engine.

In view of this reality, it is a principal problem of the present invention to provide a work vehicle in which a fuel tank can be installed while increasing a capacity of the fuel tank and preventing the fuel tank from vibrating with vibration of an engine.

Means for Solving the Problems

A first feature configuration of the present invention includes an engine arranged in a hood, a fuel tank arranged in a state of extending over inside of the hood and inside of a dashboard of a steering section in a front-rear direction, a tank support frame supporting the fuel tank, a fixing member fixing the fuel tank supported by the tank support frame, and a pivoting support frame supporting the hood such that the hood freely pivots in an up-down direction. In the configuration, the tank support frame and the pivoting support frame are supported by some other member than the engine, and as the fixing member, a first fixing member fixed in a state of extending over the tank support frame and the pivoting support frame is included.

According to this configuration, the fuel tank is arranged to extend over the hood and the dashboard, and therefore, it is possible to increase a capacity of the fuel tank. The tank support frame supporting the fuel tank is supported by some other member than the engine, and therefore, it is possible to prevent the engine and the tank support frame from vibrating together in an integral manner and also to support the fuel tank while preventing vibration of the engine from being transmitted to the fuel tank.

In fixing the fuel tank supported by the tank support frame, the first fixing member is not only fixed to the tank support frame but also fixed in a state of extending over the tank support frame and the pivoting support frame. Moreover, the pivoting support frame is supported by a different member from the engine. Thus, the fuel tank can be fixed in a state of extending over two frames, that is, the tank support frame and the pivoting support frame, while properly preventing the vibration of the engine from being transmitted to the fuel tank via the first fixing member, so that the fuel tank can be properly and firmly fixed.

In a second feature configuration of the present invention, as the fixing member, the first fixing member arranged in a state of straddling the fuel tank in a left-right direction in one side of the fuel tank in the front-rear direction and a second fixing member fixed so as to extend over the tank support frame in a state of straddling the fuel tank in the left-right direction in the other side of the fuel tank in the front-rear direction.

According to this configuration, as the fixing member, the first fixing member and the second fixing member are provided, and therefore, both sides of the fuel tank in a front side and a rear side can be stably fixed with a simple configuration, so that the fuel tank can be fixed in a stable posture while simplifying the configuration.

In a third feature configuration of the present invention, the tank support frame is supported by a front frame supporting a radiator arranged in a position more forward than the engine, an engine frame supporting the engine, and a pedal frame supporting a pedal of the steering section as some other member than the engine, and the pivoting support frame is supported by the front frame and the tank support frame as some other member than the engine.

According to this configuration, for supporting the tank support frame and the pivoting support frame, the front frame, the engine frame, and the pedal frame can be effectively used, instead of installing a dedicated frame. Accordingly, while simplifying the configuration, the tank support frame and the pivoting support frame can be properly supported in a state where the vibration of the engine is prevented from being transmitted.

In a fourth feature configuration of the present invention, the tank support frame constitutes a portion of a partition member partitioning an engine side and a fuel tank side from each other above the engine, and the fuel tank is supported by the tank support frame in a state where the fuel tank is located above the engine.

According to this configuration, the tank support frame can be used not only for supporting the fuel tank but also as a portion of the partition member that reduces influences of heat radiation from the engine, so that the configuration can be simplified. Moreover, the fuel tank is supported by the tank support frame in a state where the fuel tank is located above the engine, and therefore, a space above the engine can be effectively used as an installation space for the fuel tank in a limited space in the hood, and the capacity of the fuel tank can be efficiently increased.

A fifth feature configuration of the present invention further includes a heat shielding body partitioning an engine side and a dashboard side from each other in the front-rear direction and preventing heat from the engine from moving to the dashboard side, the fuel tank is provided in a state of extending in the front-rear direction in which a front side portion thereof is located in a hood side and a rear side portion thereof is located in the dashboard side, the heat shielding body is configured to be divisible in the up-down direction into an upper side split heat shielding body and a lower side split heat shielding body, based on a lower end portion of the rear side portion of the fuel tank as a reference, and the lower side split heat shielding body of the heat shielding body constitutes a portion of a partition member partitioning the engine side and the dashboard side from each other.

According to this configuration, the heat shielding body is divisible into the upper side split heat shielding body and the lower side split heat shielding body, based on the lower end portion of the rear side portion of the fuel tank as a reference, and therefore, the fuel tank is located in an upper side split heat shielding body side, not in a lower side split heat shielding body side. Therefore, the presence of the fuel tank and the tank support frame can also partially partition the engine side and the dashboard side from each other, and therefore, the upper side split heat shielding body can partition the engine side and the dashboard side from each other while using the configurations of the fuel tank and the tank support frame. On the other hand, the lower side split heat shielding body may have a configuration partitioning the engine side and the dashboard side from each other without considering the fuel tank, and therefore, the configuration can be simplified. Moreover, the lower side split heat shielding body is configured also as a portion of the partition member and, in this respect, this configuration is advantageous in terms of simplification of the configuration as well. Therefore, by dividing the heat shielding body in the up-down direction in accordance with an arrangement relationship with the fuel tank while arranging the rear side portion of the fuel tank also in the dashboard side to effectively increase the capacity of the fuel tank, the heat shielding body can be simply and rationally configured.

A sixth feature configuration of the present invention further includes a heat shielding body partitioning an engine side and a dashboard side from each other in the front-rear direction and preventing heat from the engine from moving to the dashboard side, the tank support frame is provided in a state of extending over a hood side and the dashboard side in the front-rear direction, the fuel tank is supported by the tank support frame in a state of extending in the front-rear direction in which a front side portion thereof is located in the hood side and the rear side portion thereof is located in the dashboard side, the heat shielding body is configured to be divisible in the up-down direction into an upper side split heat shielding body and a lower side split heat shielding body, based on a lower end portion of the rear side portion of the fuel tank as a reference, and the upper side split heat shielding body of the heat shielding body constitutes a portion of the tank support frame.

According to this configuration, the heat shielding body is divisible into the upper side split heat shielding body and the lower side split heat shielding body, based on the lower end portion of the rear side portion of the fuel tank as a reference, and therefore, the fuel tank is located in an upper side split heat shielding body side, not in a lower side split heat shielding body side. Thus, the upper side split heat shielding body can partition the engine side and the dashboard side from each other while using the fuel tank and the tank support frame and can be configured also as a portion of the tank support frame. The lower side split heat shielding body can partition the engine side and the dashboard side from each other with a simple configuration without considering the fuel tank. Accordingly, by dividing the heat shielding body in the up-down direction in accordance with an arrangement relationship with the fuel tank while arranging the rear side portion of the fuel tank also in the dashboard side to effectively increase the capacity of the fuel tank, the heat shielding body can be simply and rationally configured.

In a seventh feature of the present invention, the fuel tank is provided in a state of extending in the front-rear direction in which a front side portion thereof is located in a hood side and a rear side portion thereof is located in a dashboard side, and a communication device that can freely communicate information to outside is arranged in an upper portion of the rear side portion of the fuel tank.

According to this configuration, the front side portion of the fuel tank is located in the hood side and the rear side portion thereof is located in the dashboard side, and therefore, the fuel tank can be arranged using a space in the dashboard, so that the capacity of the fuel tank can be effectively increased. Moreover, the rear side portion of the fuel tank is used as an installation position for the communication device, so that not only the communication device can be installed while effectively using the fuel tank but also the communication device can be arranged without being exposed to the outside. Therefore, deterioration, a failure, or the like of the communication device caused by exposure to the outside can be prevented, and the rear side portion is suitable as an installation position for the communication device.

DESCRIPTION OF EMBODIMENTS

An embodiment of a work vehicle according to the present invention will be described with reference to the accompanying drawings.

Figure 1:
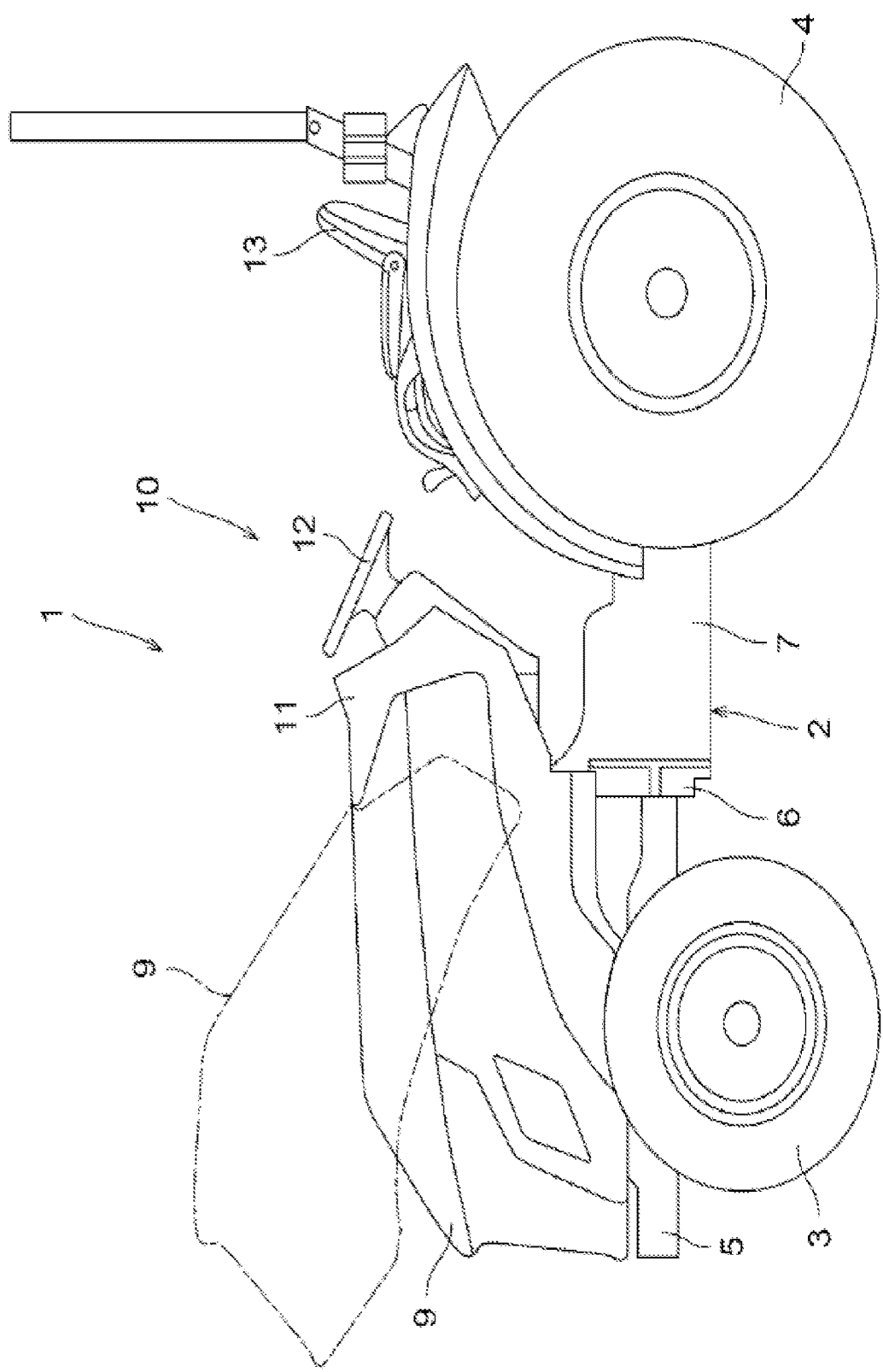
FIG. 1 is an overall schematic side view of a tractor.

As illustrated in FIG. 1, a tractor 1 is applied as a work vehicle, but various types of work vehicles other than a tractor, such as a riding type transplanter, a riding type mower, a wheel loader, or the like, can be applied.

As illustrated in FIG. 1, the tractor 1 includes a fuselage (vehicle body) 2, left and right front wheels 3 that function as drivable steering wheels, and left and right rear wheels 4 that are drivable. The fuselage 2 is configured to extend in a front-rear direction by integrally connecting an engine frame 5, a flywheel housing 6, a transmission case 7 and the like, and is supported by left and right front wheels 3 and the left and right rear wheels 4. Power from an engine 8 is transmitted to a transmission device or the like in the transmission case 7 via a flywheel housing 6 and the power after speed has been change by the transmission device or the like in the transmission case 7 is transmitted to the front wheels 3 and the rear wheels 4.

In a front side of the fuselage 2, a hood 9 is provided for storing the engine 8 (see FIGS. 2 and 3) and the like, and a steering section 10 having a dashboard 11, a steering wheel 12, a driver's seat 13, and the like is provided rearward of the hood 9 in a middle portion of the fuselage 2 in a front-rear direction.

The hood 9 is formed in a box shape covering a front side, both sides in a left-right direction, and an upper side such that a lower side and a rear side thereof are opened, and an engine compartment 21 (see FIGS. 2 and 3) in which the engine 8 and the like are stored is formed therein. The hood 9 is pivotable in an up-down direction using its rear end portion as a fulcrum and is configured to be switchable between a state where the engine compartment 21 is closed (illustrated by the solid line in FIG. 1) and a state where the engine compartment 21 is opened (illustrated by the long dashed short dashed line in FIG. 1).

Figure 2:
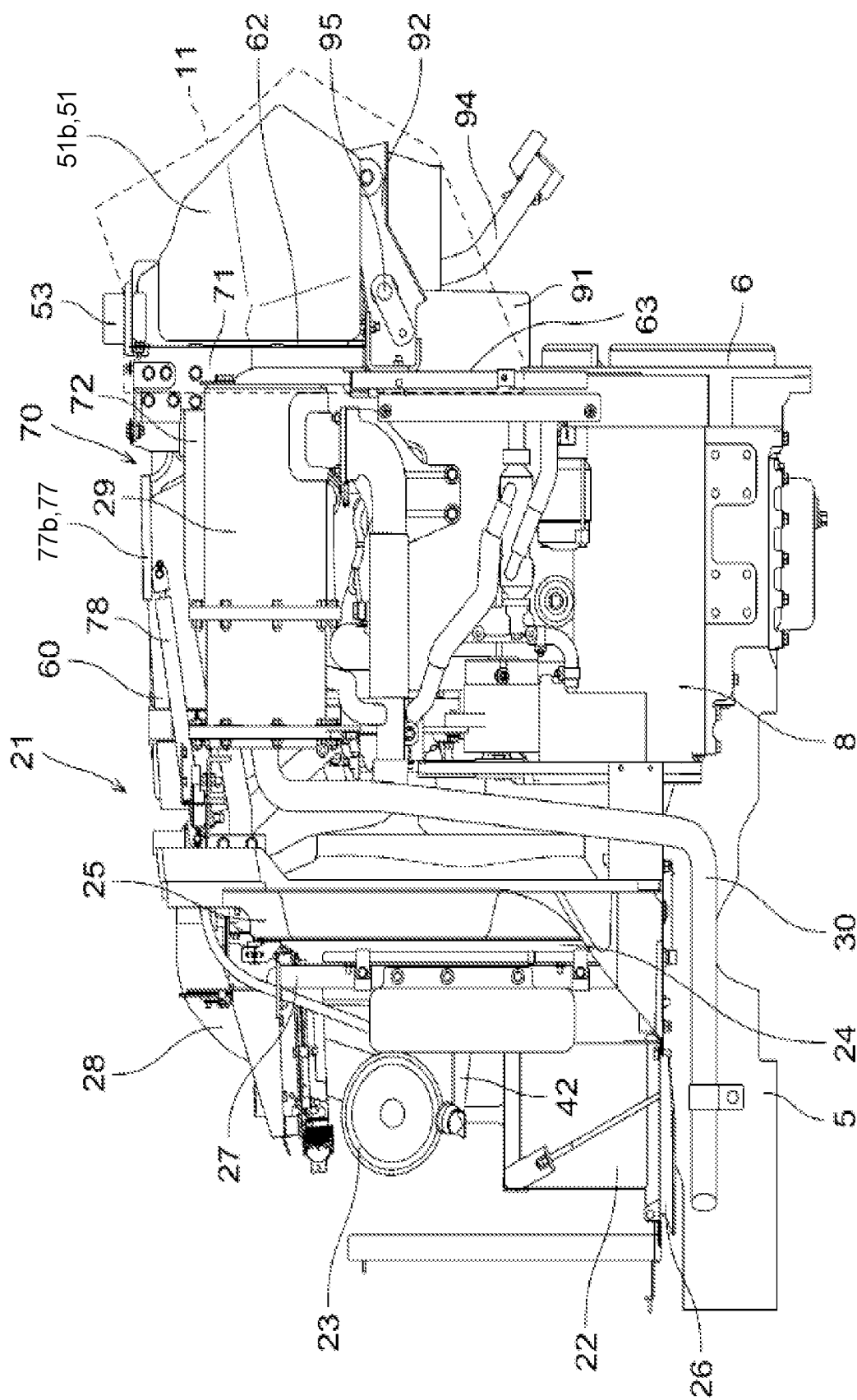
FIG. 2 is a side view illustrating an engine compartment.
Figure 3:
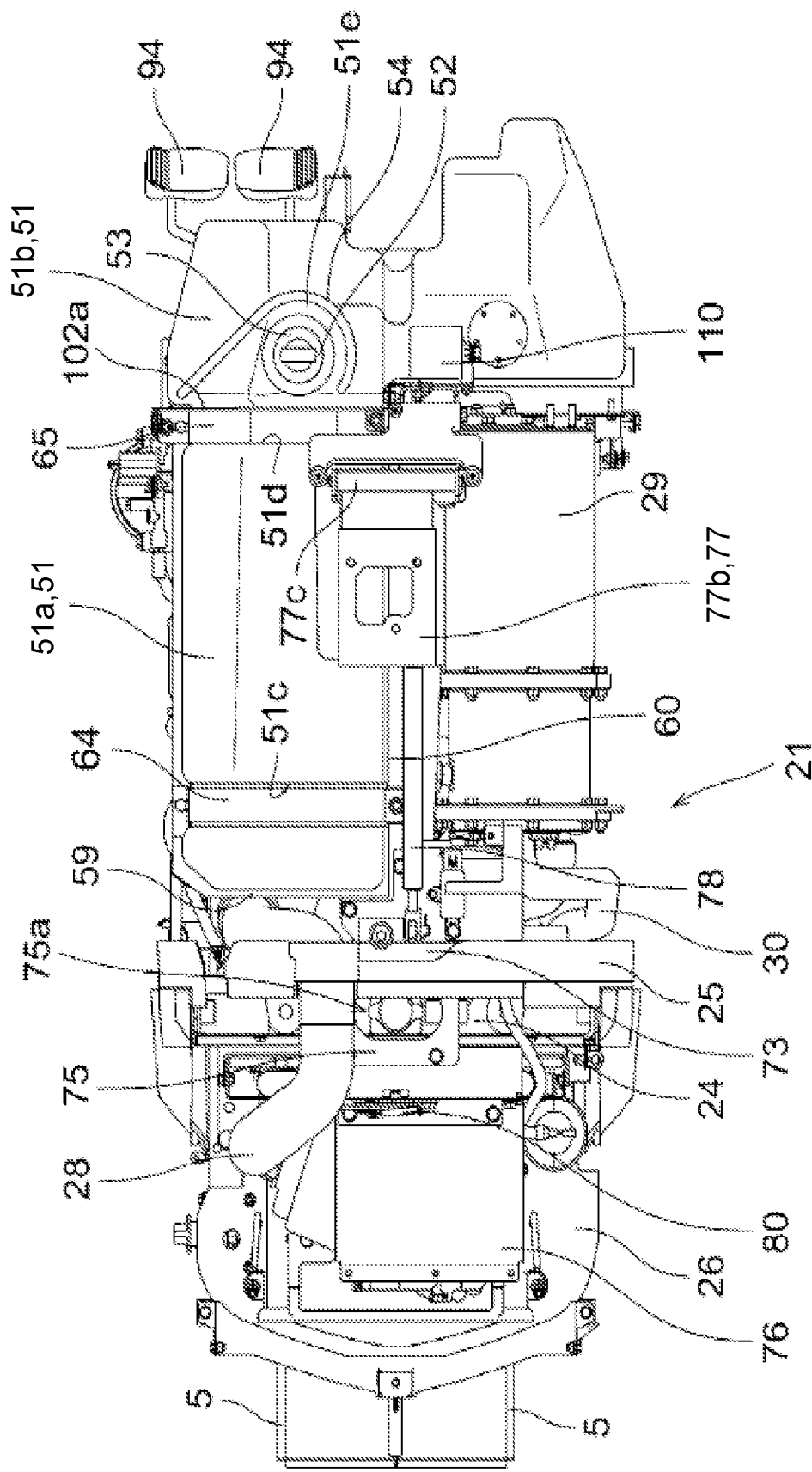
FIG. 3 is a plan view illustrating the engine compartment.

In the engine compartment 21 below the hood 9, as illustrated in FIGS. 2 and 3, a battery 22, an air cleaner 23, a radiator 24, a fan shroud 25 covering an outer circumference of a cooling fan, and the engine 8 are provided in this order from the front side of the fuselage 2 in the front-rear direction. The engine 8 is fixedly supported by a pair of left and right engine frames 5. As illustrated in FIG. 2, a plate-shaped front support stand 26 is connected to a front end side of the engine frame 5 so as to extend over the pair of left and right engine frames 5, and a battery 22, a radiator 24, and a fan shroud 25 are placed and supported on the front support stand 26.

Figure 4:
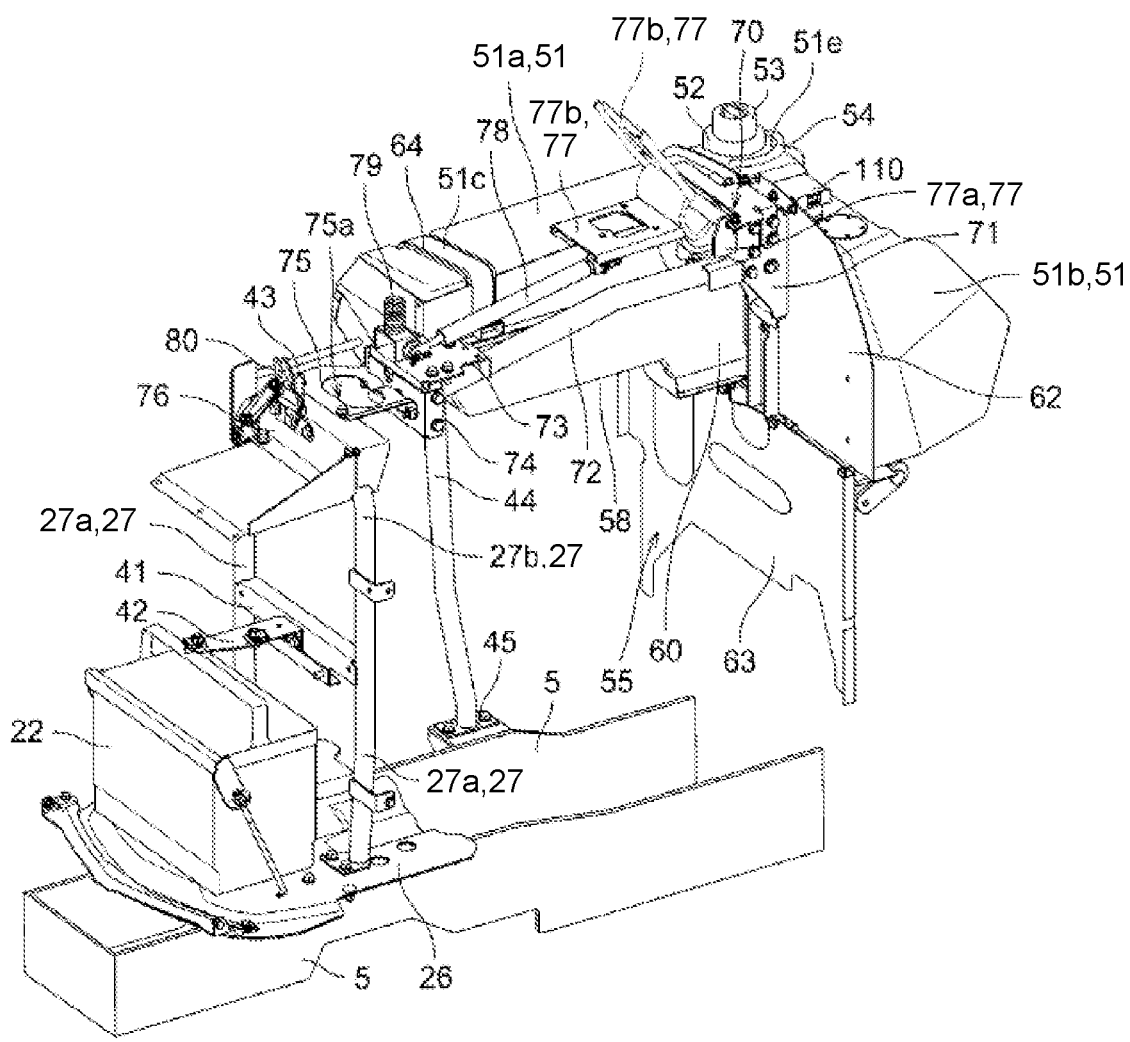
FIG. 4 is a perspective view illustrating a fuel tank and a member supporting the fuel tank when viewed from a left front side.
Figure 5:
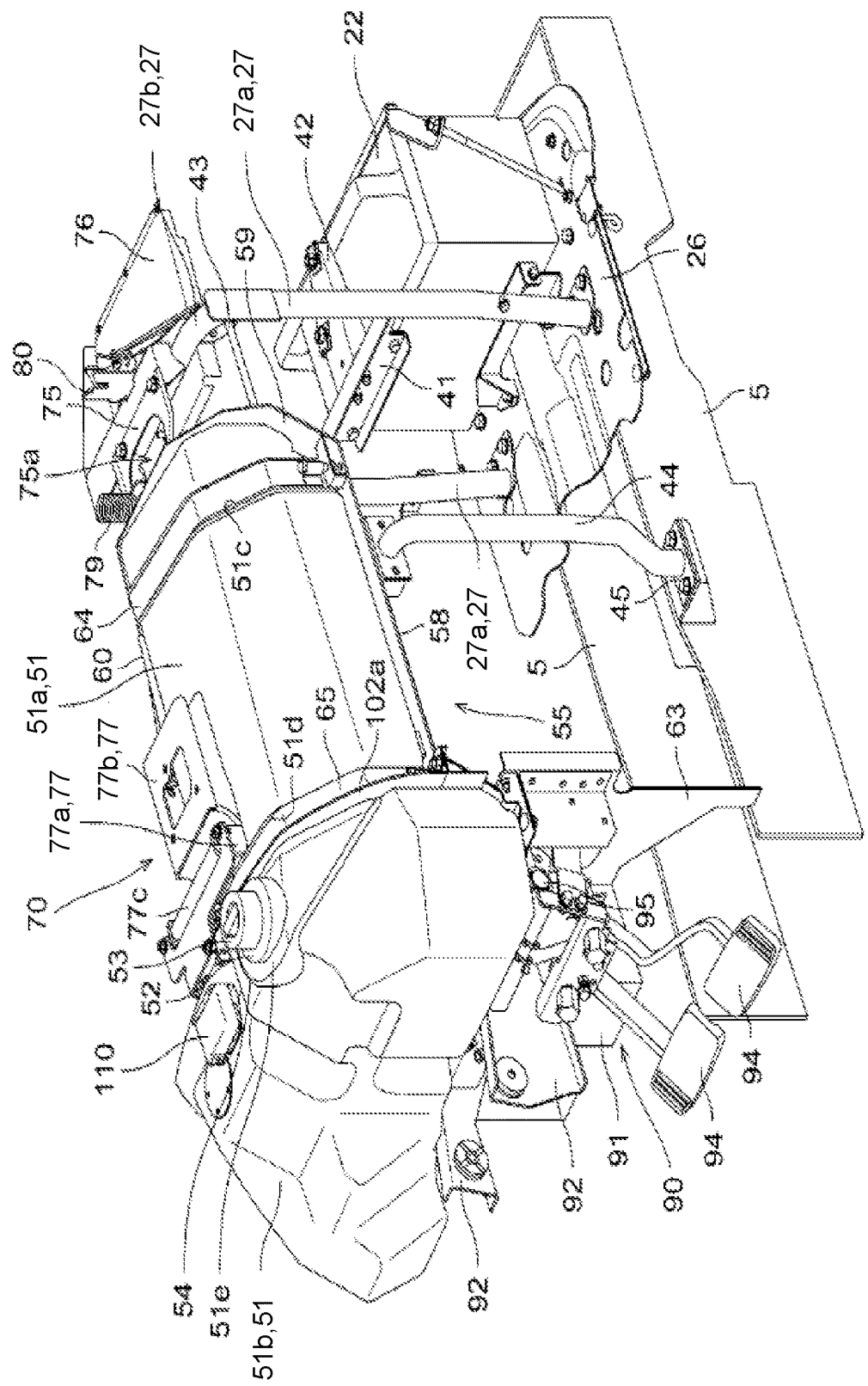
FIG. 5 is a perspective view illustrating the fuel tank and the member supporting the fuel tank when viewed from a right rear side.

As illustrated in FIGS. 4 and 5, a pipe-shaped front frame 27 is connected to the front support stand 26 in a state of standing upward from the front support stand 26. The front frame 27 is formed in an inverted U-shape having a pair of left and right extended portions 27a extending upward and a center extended portion 27b extending in the left-right direction and connecting the upper ends of the left and right extended portions 27a. A first connecting support portion 41 is provided to connect middle portions of the left and right extended portions 27a of the front frame 27 in the up-down direction, and a second connecting support portion 42 is provided to extend forward from a central portion of the first connecting support portion 41 in the left-right direction. A front end portion of the second connecting support portion 42 is connected to the battery 22, and the battery 22 is supported by the front frame 27 via the first connecting support portion 41 and the second connecting support portion 42. Although illustration is omitted, an air cleaner 23 (see FIG. 2) arranged above the battery 22 is also connected to the second connecting support portion 42 and, similar to the battery 22, is supported by the front frame 27 via the first connecting support portion 41 and the second connecting support portion 42.

As illustrated in FIGS. 2 and 3, an intake pipe 28 that supplies air purified by the air cleaner 23 to the engine 8 is provided on a right side of the fuselage 2. The intake pipe 28 connects the air cleaner 23 to the engine 8 in a state of extending over the radiator 24 and over the fan shroud 25 in the front-rear direction.

As illustrated in FIGS. 2 and 3, in an upper left side of the engine 8, a columnar exhaust gas purifying device 29 (diesel particulate filter) that is long in the front-rear direction is provided. An exhaust pipe 30 is provided in a posture extending forward and downward from the exhaust gas purifying device 29 to discharge exhaust gas from the engine 8 to a left forward and downward side of the fuselage 2.

In the engine compartment 21 in the hood 9, a fuel tank 51 is arranged above the engine 8 and rearward of the engine 8, as illustrated in FIGS. 2 and 3. The fuel tank 51 is made of resin and is provided in a long posture extending in the front-rear direction with a front side portion 51a located in a hood 9 side and a rear side portion 51b located on the dashboard 11 in a steering section 10 side.

The front side portion 51a of the fuel tank 51 has a width extending over an entire length of a right half of the fuselage 2, avoiding the exhaust gas purifying device 29 arranged in a left side of the fuselage 2, as illustrated in FIG. 3. The front side portion 51a of the fuel tank 51 is arranged above the engine 8 while avoiding the exhaust gas purifying device 29. The rear side portion 51b of the fuel tank 51 has a width extending over the entire length of the fuselage 2 in the left-right direction, since there is no interfering member in the left-right direction. The rear side portion 51b of the fuel tank 51 is arranged by effectively using an interior space of the dashboard 11. In the above-described manner, the fuel tank 51 is formed in an L-shape (see FIG. 3) in plan view, as illustrated in FIGS. 2 and 3, over the interior of each of the hood 9 and the dashboard 11, thereby increasing a capacity of the fuel tank 51.

As illustrated in FIGS. 3 and 5, a supply port 52 to the fuel tank 51 is provided on an upper right side of the rear side portion 51b of the fuel tank 51, and a supply port cap 53 that opens and closes the supply port 52 is provided. A protruding portion 54 that protrudes upward is provided around the supply port 52 at a predetermined distance from an outer periphery of the supply port 52. The protruding portion 54 is provided in the fuel tank 51 continuously from a position located more inner side than the supply port 52 in the left-right direction of the fuselage 2 to an outer side end of the fuselage 2 in the left-right direction passing through a more rear side than the supply port 52. Thus, a recessed groove 51e is formed between the supply port 52 and the protruding portion 54. Accordingly, even when fuel is spilled around the supply port 52, the fuel can be moved to an outer end portion of the fuselage 2 in the left-right direction while preventing the fuel from moving to inner and rear sides of the fuselage 2 by guiding and moving the fuel by the groove 51*e*.

Figure 7:
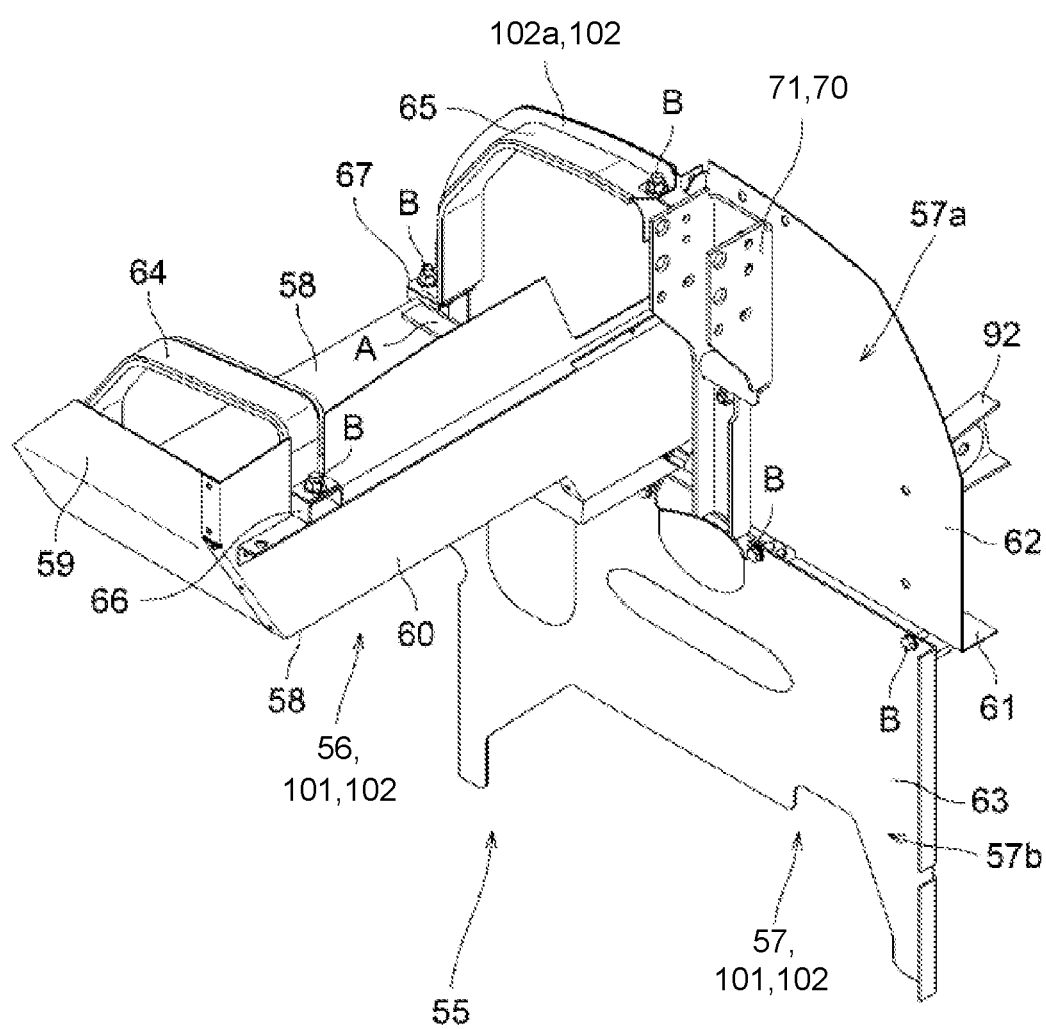
FIG. 7 is a perspective view illustration a tank support frame when viewed from a left front side.
Figure 8:
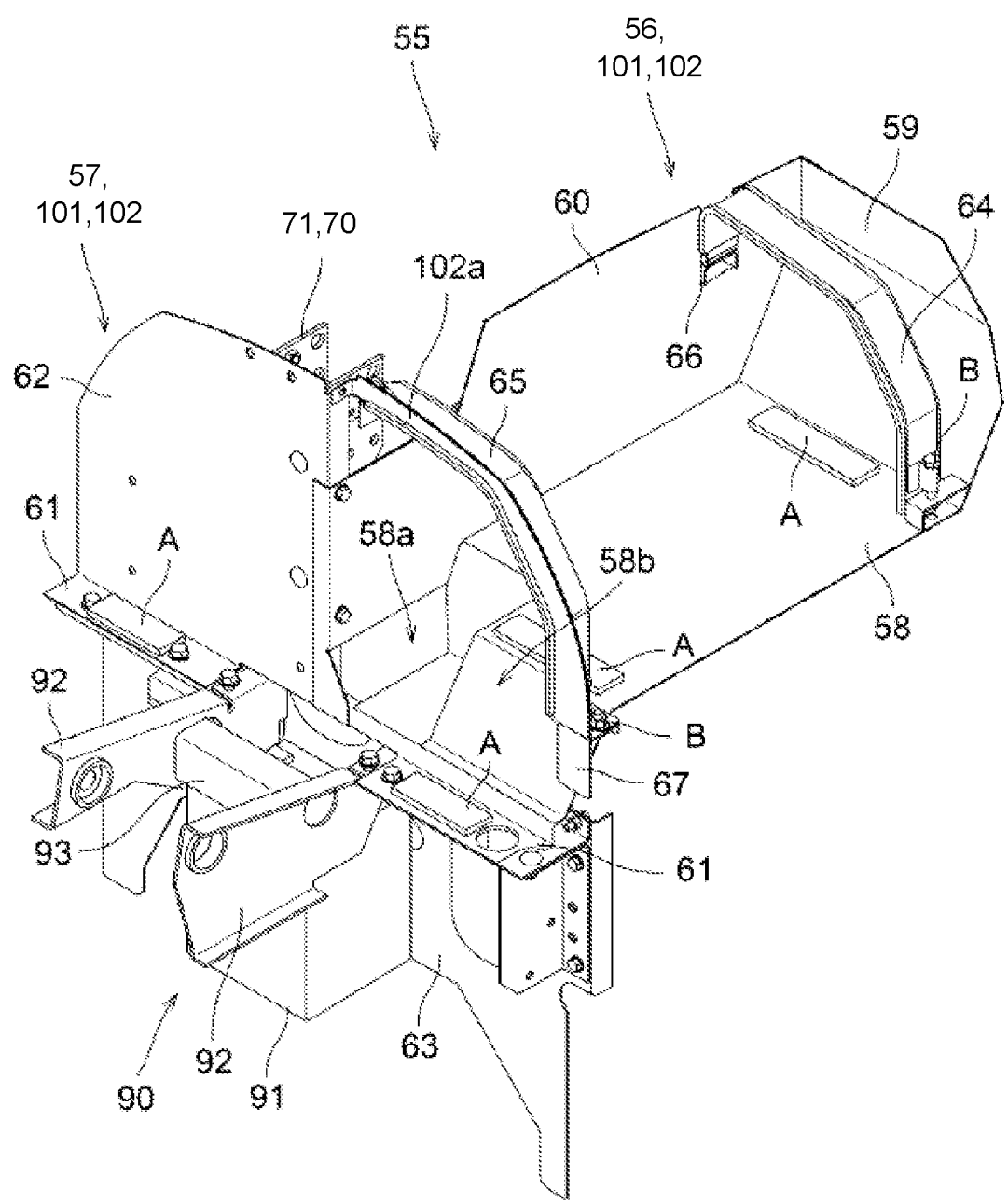
FIG. 8 is a perspective view illustrating the tank support frame when viewed from a right rear side.

Above and rearward of the engine 8, as illustrated in FIGS. 7 and 8, a tank support frame 55 that supports a fuel tank 51 is provided. The tank support frame 55 is provided with a front side frame portion 56 supporting the front side portion 51*a* of the fuel tank 51 and a rear side frame portion 57 supporting the rear side portion 51*b* of the fuel tank 51. The tank support frame 55 is arranged in a state of extending in the front-rear direction extending over from the hood 9 side to a dashboard 11 side of the steering section 10. The front side frame portion 56 is provided to extend over the entire length of the right half of the fuselage 2, the rear side frame portion 57 is provided to extend over the entire length of the fuselage 2 in the left-right direction, and the tank support frame 55 as a whole is formed in an L-shape in plan view, similar to the fuel tank 51.

As illustrated in FIGS. 4, 5, 7 and 8, the front side frame portion 56 is provided with a front side bottom portion 58 that receives and supports a bottom portion of the fuel tank 51, a front wall portion 59 that extends upward in a front end portion of the front side bottom portion 58, and a side wall portion 60 that extends upward in a left end portion of the front side bottom portion 58. FIGS. 7 and 8 illustrate the tank support frame 55 mainly by omitting the fuel tank 51 in order to make a configuration of the tank support frame 55 easier to understand. As illustrated in FIG. 8, the front side bottom portion 58 is not formed in a form of a flat surface over an entire length in the front-rear direction, but a recessed portion 58*a* protruding downward is formed in a left rear side thereof and an inclined portion 58*b* a position of which is located more downward as proceeding toward a rear side is formed in a right rear end portion thereof. As described above, by forming the recessed portion 58*a* and the inclined portion 58*b* in the front side bottom portion 58, the bottom portion of the fuel tank 51 can be formed in a shape protruding downward such that the bottom portion corresponds to the recessed portion 58*a* and the inclined portion 58*b*, thereby increasing the capacity of the fuel tank 51.

Figure 9:
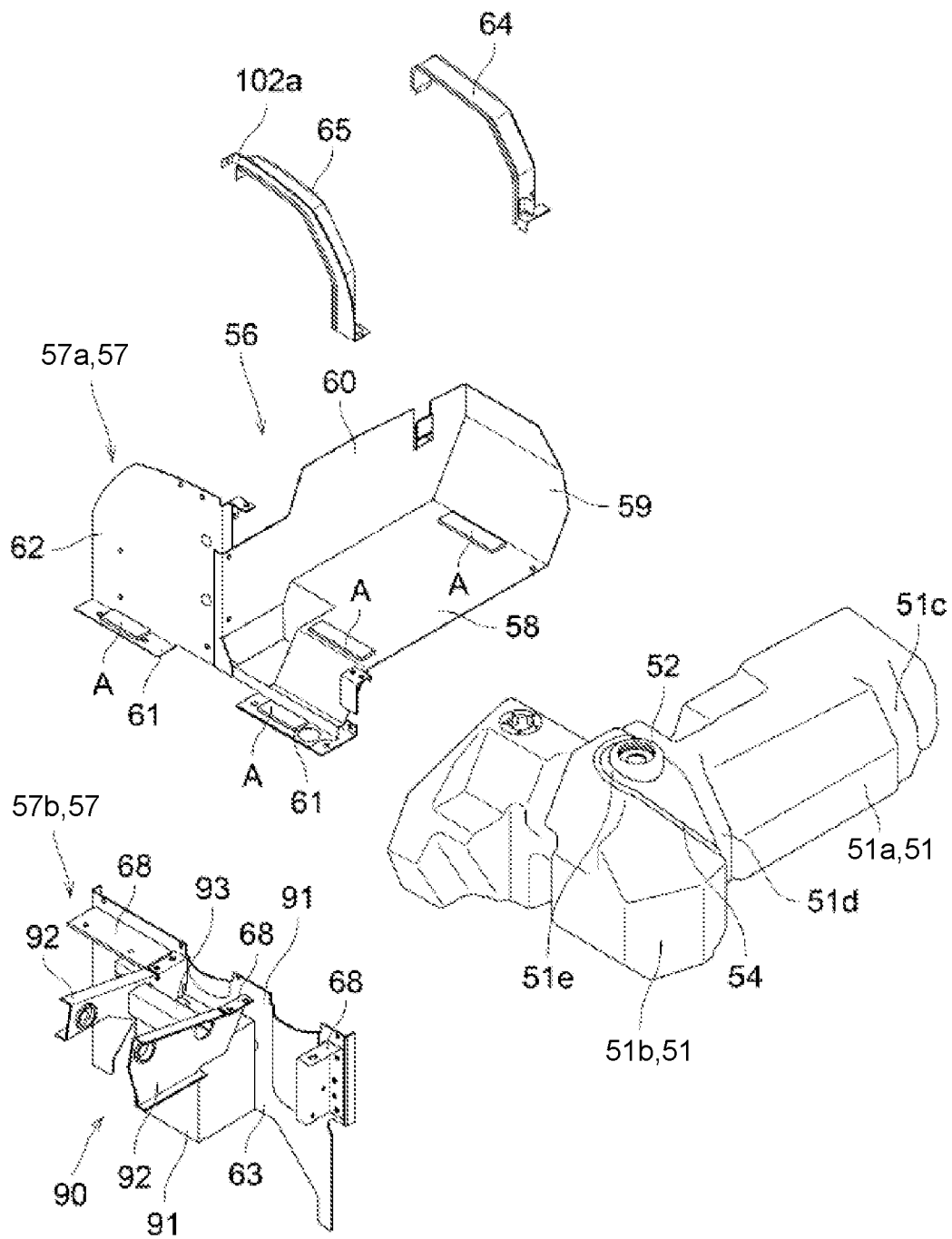
FIG. 9 is an exploded perspective view illustrating the tank support frame.

As illustrated in FIG. 8, the rear side frame portion 57 is provided with a pair of left and right rear side bottom portions 61 that receive and support the bottom portion of the fuel tank 51, a rear upper side wall portion 62 that extends in a position located more upward than a rear side bottom portion 61 in a left half of the fuselage 2, and a rear lower side wall portion 63 that extends in a position more downward than the rear side bottom portion 61 over the entire length of the fuselage 2 in the left-right direction. The rear side bottom portion 61 is connected to an upper end portion of the rear lower side wall portion 63 and is provided in a posture extending rearward from the rear lower side wall portion 63 at intervals in the left-right direction of the fuselage 2. The rear upper side wall portion 62 is connected to a portion extending in a left side in the rear side bottom portion 61 and is provided in a standing posture extending upward. The rear side bottom portion 61 and the rear upper side wall portion 62 are integrally provided by fastening with a fastener or the like, and the rear side frame portion 57 is configured to be freely dividable in the up-down direction into an integrated portion of the rear side bottom portion 61 and the rear upper side wall portion 62 and the rear lower side wall portion 63, as illustrated in FIG. 9.

The tank support frame 55 is supported by some other member than the engine 8, such as the front frame 27, the engine frame 5, a pedal frame 90, and the like, as illustrated in FIGS. 4 and 5. This prevents a vibration of the engine 8 from being transmitted directly to the tank support frame 55, so that the fuel tank 51 can be supported while preventing the vibration of the engine 8 from being transmitted to the fuel tank 51. Furthermore, the front frame 27 supports the radiator 24 or the like, the engine frame 5 supports the engine 8, the pedal frame 90 supports a brake pedal 94 or the like, and these frames can be effectively used to simplify the configuration while supporting the tank support frame 55.

As illustrated in FIGS. 4 and 5, the front wall portion 59 of the front side frame portion 56 in the tank support frame 55 is connected to and supported by the front frame 27 via a third connecting support portion 43. The front side bottom portion 58 of the front side frame portion 56 in the tank support frame 55 is connected to and supported by the engine frame 5 via a fourth connecting support portion 44 and a fifth connecting support portion 45. The fourth connecting support portion 44 is formed in a pipe shape extending in the up-down direction, and the fifth connecting support portion 45 is formed in a plate shape extending outward from the engine frame 5. Connection of the front side bottom portion 58 with the fourth connecting support portion 44, connection of the fourth connecting support portion 44 with the fifth connecting support portion 45, and connection of the fifth connecting support portion 45 with the engine frame 5 are made by fastening with fasteners, welding, or the like. The rear lower side wall portion 63 of the rear side frame portion 57 in the tank support frame 55 is connected to and supported by the pedal frame 90.

The pedal frame 90 supports a pair of left and right brake pedals 94 or the like, as illustrated in FIGS. 5 and 8, and is connected to and supported by the flywheel housing 6 (see FIG. 2) in the fuselage 2. Incidentally, in FIG. 5, only the brake pedal 94 arranged in the right side of the fuselage 2 is illustrated but, for example, a clutch pedal or the like can be arranged in the left side of the fuselage 2. The pedal frame 90 is provided with a first pedal frame portion 91 extending in the up-down direction, a pair of left and right second pedal frame portions 92 extending rearward from both of left and right sides of the first pedal frame portion 91, and a third pedal frame portion 93 arranged above the first pedal frame portion 91. As illustrated in FIG. 5, the third pedal frame portion 93 rotatably supports a rotating shaft portion 95 extending in the left-right direction. The pair of left and right brake pedals 94 are attached to the rotating shaft portion 95 and are supported so as to be freely pivotable around the rotating shaft portion 95 by rotation of the rotating shaft portion 95.

As illustrated in FIGS. 4, 5, 7 and 8, the tank support frame 55 has a front side frame portion 56 arranged in the hood 9 and a rear side frame portion 57 arranged in the dashboard 11. Thus, as illustrated in FIGS. 2 and 3, the fuel tank 51 is supported by the tank support frame 55 with the front side portion 51*a* located in the hood 9 and the rear side portion 51*b* located in the dashboard 11. Accordingly, the fuel tank 51 can be properly supported by the tank support frame 55 while the interior of each of the hood 9 and the dashboard 11 is effectively used to increase the capacity of the fuel tank 51. As illustrated in FIG. 8, a vibration control material A is arranged in each of the front side bottom portion 58 of the front side frame portion 56 and the rear side bottom portion 61 of the rear side frame portion 57 in the tank support frame 55. The bottom portion of the fuel tank 51 is received and supported by the front side bottom portion 58 and the rear side bottom portion 61 via the vibration control material A, and the fuel tank 51 is vibration-isolated and supported via the vibration control material A.

As illustrated in FIGS. 4, 5, 7 and 8, the fuel tank 51 is supported by the tank support frame 55 and is fixed by the fixing members 64 and 65. As the fixing members 64 and 65, a front side fixing member 64 (corresponding to the second fixing member) arranged in a state of straddling the fuel tank 51 in the left-right direction in a front side of the fuel tank 51 in the front-rear direction, and a rear side fixing member 65 (corresponding to the first fixing member) in an inverted U-shape arranged in a state of straddling the fuel tank 51 in the left-right direction in a rear side of the fuel tank 51 in the front-rear direction are provided.

As illustrated in FIG. 3, the front side fixing member 64 is arranged in a state of fitting into a front recessed portion 51c formed in the front side of the fuel tank 51, and the rear side fixing member 65 is arranged in a state of fitting into a rear recessed portion 51d formed in the rear side of the fuel tank 51.

As illustrated in FIGS. 7 and 8, the front side fixing member 64 is connected and fixed to the tank support frame 55 in both left and right end portions thereof. A right side end portion of the front side fixing member 64 is fixed to a right front end portion of the front side bottom portion 58 of the tank support frame 55 by a fastener B. A left side end portion of the front side fixing member 64 is fixed to a first connection fixing portion 66 arranged in the side wall portion 60 of the tank support frame 55 by the fastener B.

As illustrated in FIGS. 7 and 8, the rear side fixing member 65 has its right side end portion connected and fixed to the tank support frame 55 and its left side end portion connected and fixed to a pivoting support frame 70. The pivoting support frame 70 supports the hood 9 such that the hood 9 freely pivots in the up-down direction, and one end portion of the rear side fixing member 65 is connected and fixed to the pivoting support frame 70 that is different from the tank support frame 55. Thus, fixing of the fuel tank 51 is achieved, instead of only by a single member, that is, the tank support frame 55, by connecting and fixing the fuel tank 51 to anther member, that is, the pivoting support frame 70, so that the fuel tank 51 can be fixed efficiently and firmly. The right end portion of the rear side fixing member 65 is fixed to a second connection fixing portion 67 arranged in the right rear end portion of the front side bottom portion 58 of the tank support frame 55 by the fastener B. The left end portion of the rear side fixing member 65 is fixed to a first support frame 71 of the pivoting support frame 70 by the fastener B.

As illustrated in FIG. 4, the pivoting support frame 70 is configured by combining a plurality of frames, such as a first support frame 71, a second support frame 72, a third support frame 73, a fourth support frame 74, a fifth support frame 75, a sixth support frame 76, and the like, in this order from the rear side. The pivoting support frame 70 is arranged in a posture extending in the front-rear direction in a central portion of the fuselage 2 in the left-right direction, the rear end portion thereof is connected and fixed to the tank support frame 55, and the front end portion thereof is connected and fixed to the front frame 27.

As illustrated in FIG. 4, the first support frame 71 is connected and fixed to a front surface of the rear upper side wall portion 62 of the tank support frame 55 and is formed in a U-shaped plate shape with a front side opened in plan view in a vertically extending posture. The second support frame 72 has its rear end portion connected and fixed to the first support frame 71 and is formed in a pipe shape extending from a rear side of the fuselage 2 to the front side thereof. The third support frame 73 is connected and fixed to a front end portion of the second support frame 72 and is formed in a plate shape extending in the front-back direction and the left-right direction.

As illustrated in FIG. 4, the fourth support frame 74 has its upper end portion connected and fixed to the third support frame 73 and is formed in a plate shape extending from the upper side to the lower side. The fifth support frame 75 has its rear end portion connected and fixed to the fourth support frame 74 and is formed in a plate shape extending from the rear side to the front side. An opening 75a is formed in a center of the fifth support frame 75, and as illustrated in FIG. 3, an upper end portion of the radiator 24 is inserted in the opening 75a. As illustrated in FIG. 4, the sixth support frame 76 has its rear end portion connected and fixed to the fifth support frame 75, is formed in a plate shape extending from the rear side to the front side, and has its rear end side portion connected and fixed to the center extended portion 27b of the front frame 27. Connection and fixing of the frames to the other members and the frames to each other can be achieved by fastening with fasteners, welding, or the like.

Figure 6:
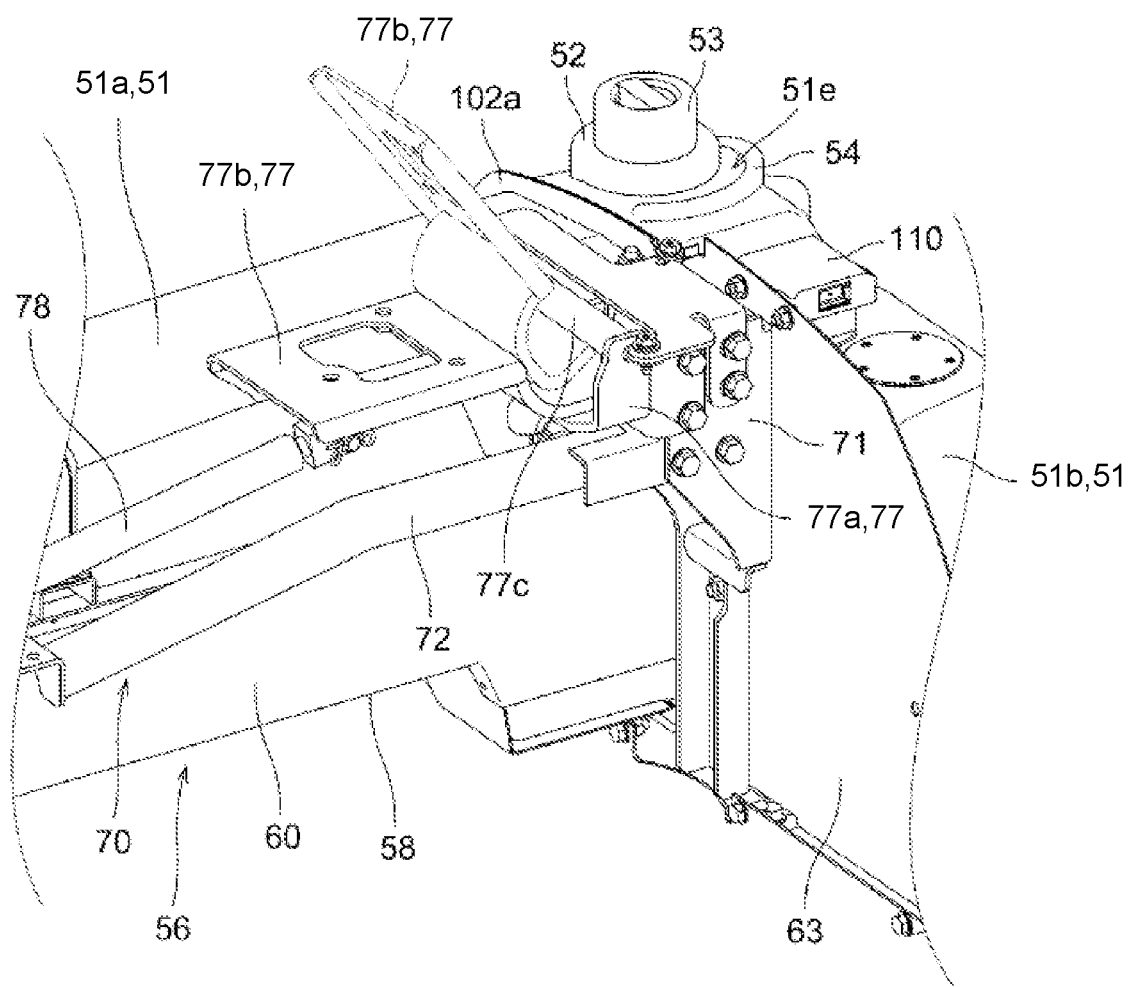
FIG. 6 is an enlarged perspective view illustrating a pivoting support frame.

The first support frame 71 is provided with a hinge section 77 that causes the hood 9 to pivot in the up-down direction, as illustrated in FIGS. 4 and 6. The hinge section 77 is provided with a fixed side hinge portion 77a fixed to the first support frame 71 side and a pivoting side hinge portion 77b that is freely pivotable around a pivoting shaft portion 77c relative to the fixed side hinge portion 77a. Although illustration is omitted, the pivoting side hinge portion 77b is connected and fixed to an inner wall portion side of the hood 9. Thus, the hood 9 is configured to pivot in the up-down direction to freely open and close due to pivoting of the pivoting side hinge portion 77b around the pivoting shaft portion 77c relative to the fixed side hinge portion 77a. In FIGS. 4 and 6, the pivoting side hinge portion 77b when the hood 9 is in a closed state is indicated by a solid line, and the pivoting side hinge portion 77b when the hood 9 is caused to pivot upward and is put in an opened state is indicated by a dotted line.

As illustrated in FIG. 4, a damper 78 is provided in a state of extending over the pivoting side hinge portion 77b of the hinge section 77 and the third support frame 73. The rear end portion of the damper 78 is pivotally connected to the pivoting side hinge portion 77b, and a front end portion of the damper 78 is pivotally connected to the third support frame 73. Thus, when the hood 9 is caused to pivot from the closed state to the opened state, the damper 78 changes its posture from a lying posture along a horizontal direction to a rearward upward inclined posture in which its position becomes more upward as proceeding toward the rear side. As the damper 78 is in the rearward upward inclined posture, the damper 78 exerts a bracing action to hold the hood 9 in the opened state.

As illustrated in FIG. 4, the third support frame 73 is provided with an elastic body 79 that not only pivotally connects a front end portion of the damper 78 but also presses against an inner wall of the hood 9 or the like to energize the hood 9 upward. The sixth support frame 76 is provided with a lock mechanism 80 that locks the hood 9 in a closed state. When the lock mechanism 80 is unlocked, the hood 9 is pressed and moved upward by an energizing force of the elastic body 79, so that a gap can be formed between a lower end portion or the like of the hood 9 and the fuselage 2. Thus, an operator can lift the hood 9 upward by putting his/her hand in the gap and can pivot the hood 9 upward to open it.

The tank support frame 55 is provided not only with a function of supporting the fuel tank 51 but also with other functions. A portion of the tank support frame 55 constitutes a portion of a partition member 101 that partitions an engine 8 side and a fuel tank 51 side from each other above the engine 8 (see FIG. 2), as illustrated in FIGS. 7 and 8. The front side frame portion 56 of the tank support frame 55 is arranged in the hood 9 and constitutes the partition member 101 that partitions the engine 8 side and the fuel tank 51 side from each other. The front side bottom portion 58 of the front side frame portion 56 is arranged to partition the engine 8 from a space located more upward than the engine 8, and secures an installation space for the fuel tank 51 partitioned from the engine 8 side above the engine 8. The side wall portion 60 of the front side frame portion 56 is arranged to partition the exhaust gas purifying device 29 and a space to right of the exhaust gas purifying device 29 in an upper portion of the engine 8 to secure an installation space for the fuel tank 51 partitioned from the exhaust gas purifying device 29 side in an upper right portion of the engine 8. The front wall portion 59 of the front side frame portion 56 is arranged to partition a front end potion of the fuel tank 51 from a space located more forward than the front end portion.

In the above-described manner, the front side frame portion 56 of the tank support frame 55 is partitioned from the engine 8 and the exhaust gas purifying device 29 to form a space surrounded by the front side bottom portion 58, the front wall portion 59, and the side wall portion 60, and the fuel tank 51 is arranged in the space. Accordingly, the front side frame portion 56 of the tank support frame 55 effectively uses the space above the engine 8 to properly support the fuel tank 51 while preventing heat from the engine 8 and the exhaust gas purifying device 29 from being transferred to the fuel tank 51 in the hood 9.

Further, a portion of the tank support frame 55 constitutes a portion of a heat shielding body 102 that prevents heat from the engine 8 and exhaust gas purifying device 29 from moving to the dashboard 11 side. The heat shielding body 102 partitions he engine 8 side and the dashboard 11 side from each other in the front-to-back direction, thereby preventing heat from moving to the dashboard 11 side. The rear side frame portion 57 of the tank support frame 55 partitions the engine 8 side and the dashboard 11 side from each other in the front-rear direction, as illustrated in FIGS. 7 and 8, and is configured as a portion of the heat shielding body 102.

The rear side frame portion 57 is not indivisible in the up-down direction, but is configured to be divisible into an upper side split body 57a (corresponding to an upper side split heat shielding body) and a lower side split body 57b (corresponding to a lower side split heat shielding body) in the up-down direction, as illustrated in FIG. 9. A position in which the rear side frame portion 57 is divided into the upper side split body 57a and the lower side split body 57b is a position determined based on a lower end portion of the rear side portion 51b of the fuel tank 51 as a reference. In this embodiment, in the rear side frame portion 57, a portion from an upper end portion of the rear side frame potion 57 to a portion thereof supporting a bottom portion of the rear side portion 51b of the fuel tank 51 is the upper side split body 57a, and a portion of the rear side frame portion 57 located more downward than the upper side split body 57a is the lower side split body 57b.

As illustrated in FIG. 9, the upper side split body 57a includes the rear side bottom portion 61 and the rear upper side wall portion 62, and the upper side split body 57a and the front side frame portion 56 are integrally provided by fastening with a fastener, welding, or the like. The lower side split body 57b includes the rear lower side wall portion 63 and is provided with a bottom portion support portion 68 that supports the rear side bottom portion 61 from a lower side. The upper side split body 57a and the lower side split body 57b are connectable, for example, by fastening with a fastener, and are configured to be divisible into the upper side split body 57a and the lower side split body 57b by unfastening the fastener. The upper side split body 57a and the lower side split body 57b can be assembled in a divided state, and an assembly work can be simplified.

The rear lower side wall portion 63 in the lower side split body 57b is arranged to partition the engine 8 side and the dashboard 11 side from each other, and is configured not only as the heat shielding body 102 but also as the partition member 101 partitioning the engine 8 side and the dashboard 11 side from each other.

In the left side of the fuselage 2 in the upper side split body 57a, the rear upper side wall portion 62 of the rear side frame portion 57 is provided in a partition state where an engine compartment 21 side in the hood 9 and a steering section 10 side of the dashboard 11 from each other. Thus, the rear upper side wall portion 62 is arranged to partition the engine 8 side and the dashboard 11 side from each other, and is configured not only as the heat shielding body 102 but also as the partition member 101 partitioning the engine 8 side and the dashboard 11 side from each other. As illustrated in FIG. 7, the rear lower side wall portion 63 and the rear upper side wall portion 62 are arranged in different positions in the front-rear direction, and the rear upper side wall portion 62 is arranged more rearward than the rear lower side wall portion 63.

In the right side of the fuselage 2 in the upper side split body 57a, as illustrated in FIG. 3, the fuel tank 51 is arranged to extend over the hood 9 side and the dashboard 11 side, so that, as illustrated in FIGS. 5 and 7, apart from the tank support frame 55, a first heat shielding body 102a that shields the engine compartment 21 side and the dashboard 11 side from each other is provided. The first heat shielding body 102a is formed in a plate shape extending upward from the rear side fixing member 65 and is provided integrally with the rear side fixing member 65. The first heat shielding body 102a is arranged to close a portion between the engine compartment 21 side and the dashboard 11 side where the fuel tank 51 and the tank support frame 55 are not present.

Although illustration is omitted, the tank support frame 55 is also used for wiring a harness. For example, a harness to be routed from the engine 8 or the like to the rear side can be routed along a lower surface of the front side bottom portion 58 of the front side frame portion 56, as illustrated in FIG. 8. In the above-described manner, the tank support frame 55 is provided in a posture along the front-rear direction between the hood 9 side and the dashboard 11 side, and therefore, various types of harnesses can be routed along a portion of the tank support frame 55.

As illustrated in FIG. 3, a communication device 110 that can freely communicate information to outside is arranged in an upper portion of the rear side portion 51b of the fuel tank 51. The communication device 110 is configured to freely communicate various information in performing a work with the tractor 1, such as operation information, such as a traveling status of the tractor 1, a working status by the tractor 1, or the like, maintenance information, or the like, to the outside. Thus, by performing a communication between an external management device and the communication device 110, various types of information in performing a work with the tractor 1 can be managed in the external management device. By arranging the communication device 110 in an upper portion of the fuel tank 51 in the dashboard 11, the communication device 110 is not exposed to the outside and deterioration and a failure can be suppressed.

Other Embodiments

Other embodiments of the present invention will be described.

A configuration of each of the embodiments described below may be applied not only independently but also in combination with configurations of other embodiments.

(1) A configuration of a work vehicle can be changed in various ways.

For example, the work vehicle may be configured in a hybrid specification including the engine 8 and an electric motor for driving.

For example, the work vehicle may be configured in a semi-crawler specification including left and right crawlers, instead of the left and right rear wheels 4, as a traveling section.

For example, the work vehicle may be configured in a rear-wheel steering specification in which the left and right rear wheels 4 function as steering wheels.

(2) In the above-described embodiment, the fuel tank 51 is made of resin, but it is not limited to resin, and some other material, such as metal or the like, can be also used to construct the fuel tank 51.

DESCRIPTION OF REFERENCE NUMERALS 1 tractor (work vehicle)
5 engine frame
8 engine
9 hood
10 steering section
11 dashboard
27 front frame
51 fuel tank
55 tank support frame
57a upper side split body (upper side split heat shielding body)
57b lower side split body (lower side split heat shielding body)
64 front side fixing member (second fixing member)
65 rear side fixing member (first fixing member)
70 pivoting support frame
90 pedal frame
101 partition member
102 heat shielding body

The invention claimed is:

1. A work vehicle comprising:
an engine, wherein the engine is arranged under a hood of the work vehicle;
a fuel tank, wherein the fuel tank extends under the hood and under a dashboard of a steering section in a front-rear direction of the work vehicle;
a tank support frame supporting the fuel tank;
at least one fixing member for securing the fuel tank to the tank support frame, wherein the at least one fixing member is supported by the tank support frame; and
a pivoting support frame supporting the hood such that the hood freely pivots in an up-down direction of the work vehicle,
wherein the tank support frame and the pivoting support frame are supported by at least one non-engine support member, and
wherein the at least one fixing member comprises a first fixing member that extends from the tank support frame and connects to the pivoting support frame in a left-right direction of the work vehicle.

2. The work vehicle according to claim 1,
wherein the first fixing member is arranged in a state of straddling the fuel tank in the left-right direction of the work vehicle, wherein the first fixing member secures a rear side of the fuel tank when viewed in the front-rear direction of the work vehicle, and the at least one fixing member further comprises a second fixing member that extends across the tank support frame in the state of straddling the fuel tank in the left-right direction of the work vehicle, and wherein the second fixing member secures a front side of the fuel tank when viewed in the front-rear direction of the work vehicle.

3. The work vehicle according to claim 1, further comprising:
an engine frame supporting the engine,
a front frame supporting a radiator arranged in a position in front of the engine when viewed in the front-rear direction of the work vehicle, wherein the tank support frame is supported by the front frame,
a pedal frame supporting a pedal of the steering section, wherein the at least one non-engine support member includes the pedal frame, and
wherein the pivoting support frame is supported by the front frame and the tank support frame.

4. The work vehicle according to claim 1,
wherein the tank support frame constitutes a portion of a partition member that partitions an engine side from a fuel tank side, wherein the tank support frame is located above the engine when viewed in the up-down direction of the work vehicle, and
the fuel tank is supported by the tank support frame in a state where the fuel tank is located above the engine when viewed in the up-down direction of the work vehicle.

5. The work vehicle according to claim 1, further comprising:
a heat shielding body partitioning an engine side of the work vehicle and a dashboard side of the work vehicle from each other in the front-rear direction of the work vehicle and preventing heat from the engine from moving to the dashboard side of the work vehicle,
wherein the fuel tank is provided in a state of extending in the front-rear direction of the work vehicle, wherein a front portion of the fuel tank is located under the hood and a rear portion of the fuel tank is located under the dashboard,
the heat shielding body is divisible in the up-down direction of the work vehicle into an upper side split heat shielding body and a lower side split heat shielding body, wherein a lower end portion of the rear portion of the fuel tank serves as a reference to distinguish the upper side split heat shielding body from the lower side split heat shielding body, and
the lower side split heat shielding body of the heat shielding body constitutes a portion of a partition member partitioning the engine side of the work vehicle and the dashboard side of the work vehicle from each other.

6. The work vehicle according to claim 1, further comprising:

a heat shielding body partitioning an engine side of the work vehicle and a dashboard side of the work vehicle from each other in the front-rear direction of the work vehicle and preventing heat from the engine from moving to the dashboard side of the work vehicle, wherein the tank support frame is provided in a state of extending from under the hood to the dashboard side of the work vehicle in the front-rear direction of the work vehicle, the fuel tank is supported by the tank support frame and extends in the front-rear direction of the work vehicle, wherein a front portion of the fuel tank is located under the hood and a rear portion of the fuel tank is located under the dashboard, the heat shielding body is divisible in the up-down direction of the work vehicle into an upper side split heat shielding body and a lower side split heat shielding body, wherein a lower end portion of the rear portion of the fuel tank serves as a reference to distinguish the upper side split heat shielding body from the lower side split heat shielding body, and the upper side split heat shielding body of the heat shielding body constitutes a portion of the tank support frame.

7. The work vehicle according to claim 1, wherein the fuel tank is provided in a state of extending in the front-rear direction of the work vehicle, wherein a front portion of the fuel tank is located under the hood and a rear portion of the fuel tank is located under the dashboard, and a communication device capable of communication with one or more other devices external to the work vehicle is arranged in an upper end portion of the rear portion of the fuel tank.

\* \* \* \* \*